United States Patent
Nakajima et al.

(10) Patent No.: US 11,232,529 B2
(45) Date of Patent: Jan. 25, 2022

(54) DELIVERY MANAGEMENT SYSTEM, SERVER, DELIVERY MANAGEMENT METHOD, DELIVERY USER TERMINAL, CLIENT USER TERMINAL, AND INFORMATION PROCESSING METHOD

(71) Applicant: TOYOTA JIDOSHA KABUSHIKI KAISHA, Toyota (JP)

(72) Inventors: Etsuko Nakajima, Nagoya (JP); Naoki Uenoyama, Nisshin (JP); Junya Masui, Nagoya (JP); Akira Hoshino, Nagoya (JP); Hideo Hasegawa, Nagoya (JP); Keiko Nakano, Kawasaki (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 138 days.

(21) Appl. No.: 16/212,721

(22) Filed: Dec. 7, 2018

(65) Prior Publication Data

US 2019/0180402 A1 Jun. 13, 2019

(30) Foreign Application Priority Data

Dec. 13, 2017 (JP) .............................. JP2017-238784

(51) Int. Cl.
G06Q 20/14 (2012.01)
G07C 9/00 (2020.01)
(Continued)

(52) U.S. Cl.
CPC ............. *G06Q 50/28* (2013.01); *G06Q 20/14* (2013.01); *G07C 9/00309* (2013.01); *G07F 17/13* (2020.05)

(58) Field of Classification Search
CPC .......... G06Q 50/28; G06Q 20/14; G07C 9/00; B60R 25/24; B60R 25/01
(Continued)

(56) References Cited

U.S. PATENT DOCUMENTS

| 2004/0181570 A1 | 9/2004 | Kaneko |
| 2018/0240067 A1* | 8/2018 | Oz .................. G06F 16/951 |
| 2019/0034858 A1* | 1/2019 | Ferguson ............. G01C 21/343 |

FOREIGN PATENT DOCUMENTS

| CN | 102750785 A | 10/2012 |
| CN | 104732598 A | 6/2015 |

(Continued)

OTHER PUBLICATIONS

Dialog Non-Patent Literatures Search Report, dated Sep. 17, 2021. (Year: 2021).*

*Primary Examiner* — Hai Tran
(74) *Attorney, Agent, or Firm* — Oblon, McClelland, Maier & Neustadt, L.L.P.

(57) ABSTRACT

A delivery management system includes a client user terminal, a lock/unlock device, a delivery user terminal, and a processor. The client user terminal is used by a client user who submits a request to deliver the package to a predetermined compartment of a vehicle. The processor makes an electronic payment for a fee when a request to pay for the fee associated with a package has been made from the client user terminal. The processor issues authentication information to a delivery user terminal when the processor has made the electronic payment in a case where there is specification that the client user pays for the fee at the time of delivery of the package. The delivery user terminal makes a request of a lock/unlock device to lock or unlock the predetermined compartment with the authentication information. The lock/unlock device locks or unlocks the predetermined compartment.

8 Claims, 7 Drawing Sheets

(51) Int. Cl.
    *B60R 25/24*    (2013.01)
    *B60R 25/01*    (2013.01)
    *G06Q 50/28*    (2012.01)
    *G07F 17/12*    (2006.01)
(58) Field of Classification Search
    USPC .......................................................... 705/40
    See application file for complete search history.

(56) References Cited

FOREIGN PATENT DOCUMENTS

| | | |
|---|---|---|
| CN | 106295289 A | 1/2017 |
| CN | 107451764 A | 12/2017 |
| JP | 2002-367029 A | 12/2002 |
| JP | 2004-339737 A | 12/2004 |
| JP | 2006-206225 | 8/2006 |
| JP | 2015-45141 A | 3/2015 |
| JP | 2016-211157 A | 12/2016 |

\* cited by examiner

FIG. 3

| CLIENT USER ID | DELIVERY DATE | PLACE OF DELIVERY | DELIVERY STATUS | PACKAGE ATTRIBUTE | PAYMENT METHOD | PAYMENT STATUS |
|---|---|---|---|---|---|---|
| S001 | 2017/11/01 | VEHICLE | COMPLETED | ... | AT TIME OF ARRIVAL | COMPLETED |
| S001 | 2017/11/02 | VEHICLE | COMPLETED | ... | AT TIME OF SHIPMENT | COMPLETED |
| S001 | 2017/11/03 | VEHICLE | NOT COMPLETED | ... | AT TIME OF ARRIVAL | NOT COMPLETED |

FIG. 4

| CLIENT USER ID | VEHICLE TYPE | COLOR | LICENSE NUMBER | VEHICLE LOCATION |
|---|---|---|---|---|
| S001 | ... | WHITE | XXYY | ... |

DELIVERY MANAGEMENT SYSTEM, SERVER, DELIVERY MANAGEMENT METHOD, DELIVERY USER TERMINAL, CLIENT USER TERMINAL, AND INFORMATION PROCESSING METHOD

INCORPORATION BY REFERENCE

The disclosure of Japanese Patent Application No. 2017-238784 filed on Dec. 13, 2017 including the specification, drawings and abstract is incorporated herein by reference in its entirety.

BACKGROUND

1. Technical Field

The disclosure relates to a delivery management system, server, delivery management method, delivery user terminal, client user terminal, and information processing method that use a predetermined compartment of a vehicle as a place of transfer of a package.

2. Description of Related Art

In recent years, development of a delivery system that uses a vehicle, having a luggage compartment and specified by a client of a delivery service, as a place of transfer of a package has been proceeding as a means of efficiently transferring the package between the client and a delivery person. For example, Japanese Unexamined Patent Application Publication No. 2006-206225 (JP 2006-206225 A) suggests a system in which, at the time when a user who delivers a package (hereinafter, also referred to as delivery user) delivers a package, an authentication process is caused to be executed between a terminal that is used by the delivery user (hereinafter, also referred to as delivery user terminal) and a vehicle communication device mounted on a specified vehicle, and, when the authentication is successful, the specified vehicle is allowed to be locked or unlocked.

SUMMARY

When a product has been ordered on an online shopping site on the Internet, set up by an electronic commerce operator, there is a need to pay for a fee associated with the product (the price of the product and a delivery charge for the product) in exchange for the product at the time of delivery of the product. However, when a luggage compartment of a vehicle is specified as a place of transfer of a package, a delivery user is not able to receive a fee associated with a product since a client (hereinafter, also referred to as client user) of a delivery service does not attend at the time of delivery of the product. Therefore, it may be difficult to purchase a product by payment on delivery or by freight collect.

The disclosure provides a system that enables collection of a fee associated with a package even when a vehicle having a predetermined compartment has been specified as a place of delivery of the package.

An aspect of the disclosure relates to a delivery management system. The delivery management system includes a processor. The processor is configured to make an electronic payment for a fee when a request to pay for the fee associated with a package has been made from a client user terminal. The client user terminal is used by a client user who submits a request to deliver the package to a predetermined compartment of a vehicle. The processor is configured to issue authentication information to a delivery user terminal when the processor has made the electronic payment in a case where there is specification that the client user pays for the fee at the time of delivery of the package. The delivery user terminal is used by a delivery user who delivers the package. The delivery user terminal is configured to make a request of a lock and unlock device to lock or unlock the predetermined compartment with the use of the authentication information. The lock and unlock device is provided in the vehicle. The lock and unlock device is configured to lock or unlock the predetermined compartment.

The predetermined compartment provided inside the vehicle is locked or unlocked, so access of the delivery user to the predetermined compartment is controlled. Examples of the predetermined compartment may include a trunk (luggage compartment) of the vehicle, and a passenger compartment, such as a passenger seat, of the vehicle. In order to lock or unlock the predetermined compartment, the delivery user is required to get the authentication information issued from the processor to the delivery user terminal. The processor makes an electronic payment for a fee associated with a package in place of the delivery user. The fee includes the price of an article or a delivery charge for a package. The processor does not transmit the authentication information to the delivery user terminal when the processor has not completed the electronic payment for the fee, so the delivery user is not allowed to put the package in the predetermined compartment until the electronic payment has been completed. On the other hand, the processor transmits the authentication information to the delivery user terminal when the processor has completed the electronic payment, so the delivery user terminal is allowed to lock or unlock the predetermined compartment with the use of the authentication information. In this way, when the processor makes an electronic payment for a fee associated with a package, it is possible to collect the fee associated with the package even when a vehicle having a predetermined compartment has been specified as a place of delivery of the package.

The processor may be configured to issue the authentication information for locking or unlocking the predetermined compartment. The processor may be configured to be not permitted to issue the authentication information when the processor has not completed the electronic payment for the fee in the case where there is specification that the client user pays for the fee at the time of delivery of the package. The processor may be configured to be permitted to issue the authentication information when the processor has completed the electronic payment for the fee in the case where there is specification that the client user pays for the fee at the time of delivery of the package.

The specification that the client user pays for the fee at the time of delivery of the package may include at least one of payment on delivery and freight collect.

Whether there is specification that the client user pays for the fee at the time of delivery of the package may be informed by the delivery user or may be determined based on information associated with the package. When the processor has not completed the electronic payment for the fee, the processor is not permitted to issue the authentication information, so the processor is not allowed to issue the authentication information. Therefore, the delivery user terminal is not able to lock or unlock the predetermined compartment. On the other hand, when the processor has completed the electronic payment for the fee, the processor is permitted to issue the authentication information, so the processor is allowed to issue the authentication information. Therefore, the delivery user terminal is able to lock or unlock the predetermined compartment. Thus, it is possible to reduce the case where a package is delivered before a payment for a fee is made.

An aspect of the disclosure relates to a server. The server includes a processor. The processor is configured to issue authentication information for locking or unlocking a predetermined compartment of a vehicle that is a place of delivery of a package. The processor is configured to be not permitted to issue the authentication information when an electronic payment for a fee associated with the package has not been completed in a case where there is specification that a client user who has submitted a request to deliver the package to the predetermined compartment pays for the fee at the time of delivery of the package. The processor is configured to be permitted to issue the authentication information when the electronic payment for the fee has been completed in the case where there is specification that the client user pays for the fee at the time of delivery of the package.

An aspect of the disclosure relates to a delivery management method that is executed by a server. The delivery management method includes: not permitting, by the server, issuance of authentication information for locking or unlocking the predetermined compartment when an electronic payment for a fee associated with a package has not been completed in the case where a vehicle having a predetermined compartment is specified as a place of delivery of the package and there is specification that a client user who has submitted a request to deliver the package pays for the fee at the time of delivery of the package; permitting, by the server, issuance of the authentication information when the electronic payment for the fee has been completed in the case where the vehicle is specified as a place of delivery of the package and there is specification that the client user pays for the fee at the time of delivery of the package; and issuing, by the server, the authentication information when issuance of the authentication information is permitted.

An aspect of the disclosure relates to a delivery user terminal. The delivery user terminal is used by a delivery user who delivers a package to a vehicle of which a predetermined compartment is configured to be locked or unlocked by a lock and unlock device. The delivery user terminal includes a processor. The processor is configured to receive authentication information issued to the delivery user terminal when a payment for a fee associated with the package has been completed in the case where there is specification that a client user who submits a request to deliver the package to the predetermined compartment of the vehicle pays for the fee at the time of delivery of the package together with information indicating that the payment has been completed. The processor is configured to make a request of the lock and unlock device to lock or unlock the predetermined compartment with the use of the authentication information.

An aspect of the disclosure relates to an information processing method that is executed by a delivery user terminal. The delivery user terminal is used by a delivery user who delivers a package to a vehicle of which a predetermined compartment is configured to be locked or unlocked by a lock and unlock device. The information processing method includes: receiving, by the delivery user terminal, authentication information issued to the delivery user terminal, together with information indicating that the payment has been completed, when a payment for a fee associated with the package has been completed in the case where there is specification that a client user who submits a request to deliver the package to the predetermined compartment pays for the fee at the time of delivery of the package; and making, by the delivery user terminal, a request of the lock and unlock device to lock or unlock the predetermined compartment with the use of the authentication information.

An aspect of the disclosure relates to a client user terminal. The client user terminal is used by a client user who submits a request to deliver a package to a predetermined compartment of a vehicle. The client user terminal includes a processor. The processor is configured to make a request to deliver the package to the predetermined compartment based on input of the client user when specification that a payment for a fee associated with the package is made at the time of delivery of the package has been made. The processor is configured to make an electronic payment over a server based on input of the client user when a request to pay for the fee has been made. The server is configured to accept the electronic payment.

An aspect of the disclosure relates to an information processing method that is executed by a client user terminal. The client user terminal is used by a client user who submits a request to deliver a package to a predetermined compartment of a vehicle. The information processing method includes: making, by the client user terminal, a request to deliver the package to the predetermined compartment based on input of the client user when specification that a payment for a fee associated with the package is made at the time of delivery of the package has been made; and making, by the client user terminal, an electronic payment over a server based on input of the client user when a request to pay for the fee has been made, the server being configured to accept the electronic payment. With this information processing method, even when there is specification that a payment for the fee is made at the time of delivery of the package, the client user is not required to go to the vehicle to pay for the fee, so it is possible to appropriately perform delivery to the vehicle.

An aspect of the disclosure relates to a delivery management system. The delivery management system includes a client user terminal, a lock and unlock device, a delivery user terminal, and a processor. The client user terminal is used by a client user who submits a request to deliver a package to a predetermined compartment of a vehicle. The lock and unlock device is provided in the vehicle. The lock and unlock device is configured to lock or unlock the predetermined compartment. The delivery user terminal is used by a delivery user who delivers the package. The delivery user terminal is configured to make a request of the lock and unlock device to lock or unlock the predetermined compartment with the use of authentication information. The processor is configured to, when a request to pay for a fee associated with the package has been made from the client user terminal, make an electronic payment for the fee. The processor is configured to, when the processor has made the electronic payment in the case where there is specification that the client user pays for the fee at the time of delivery of the package, issue the authentication information to the delivery user terminal.

According to the aspects of the disclosure, it is possible to provide a system that enables collection of a fee associated with a package even when a vehicle having a predetermined compartment has been specified as a place of delivery of the package.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein:

FIG. 3 is a view that shows an example of the configuration of a delivery information table;

FIG. 4 is a view that shows an example of the configuration of a vehicle management information table;

DETAILED DESCRIPTION OF EMBODIMENTS

Hereinafter, a specific embodiment of the disclosure will be described with reference to the accompanying drawings. The sizes, materials, shapes, relative arrangement, and the like, of components described in the present embodiment do not intend to limit the technical scope unless otherwise specified.

Embodiment

Outline of System

Figure 1:
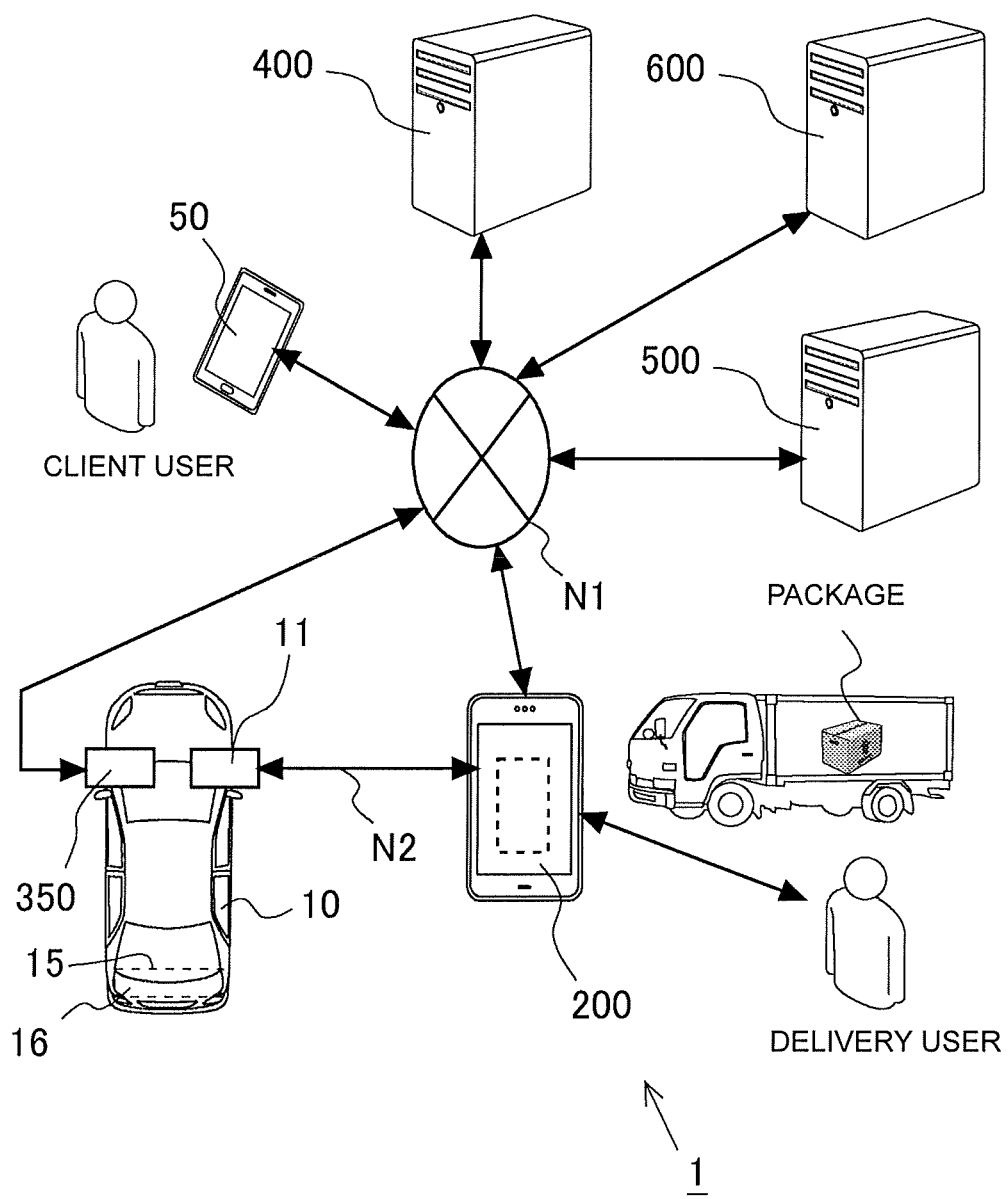
FIG. 1 is a view that shows the schematic configuration of a delivery management system according to an embodiment.

FIG. 1 is a diagram that shows the schematic configuration of a delivery management system 1 according to the present embodiment. The delivery management system 1 is a system for a delivery service. The delivery service uses a luggage compartment 15 (trunk) of a vehicle 10 as a place of transfer by allowing the shared use of the luggage compartment 15 between a client who requests delivery of a package and a person that delivery of the package has been requested of. The luggage compartment 15 is specified by the client. Hereinafter, a person who requests delivery of a package is referred to as client user, and a person that delivery of a package has been requested of is referred to as delivery user. The luggage compartment 15 is a predetermined compartment inside the vehicle 10. A package to be delivered is placeable in the predetermined compartment. The predetermined compartment is configured to be locked or unlocked by an in-vehicle device 11 (described later). The luggage compartment 15 is a space separated from a passenger compartment in which a driver, and the like, of the vehicle 10 are seated such that the luggage compartment 15 and the passenger compartment are inaccessible to each other. A luggage compartment door 16 is provided for the luggage compartment 15. The luggage compartment door 16 is able to be opened or closed from the outside of the vehicle 10.

In the example of FIG. 1, the delivery management system 1 includes the in-vehicle device 11, a delivery user terminal 200, a client user terminal 50, a center server 400, a delivery management server 500, and a payment management server 600. The in-vehicle device 11 is installed in the vehicle 10. The in-vehicle device 11, the delivery user terminal 200, the client user terminal 50, the center server 400, the delivery management server 500, and the payment management server 600 are connected to one another by a network N1. The network N1 is a worldwide public telecommunication network, such as the Internet. A wide area network (WAN) or another communication network may be employed as the network N1. The network N1 may include a telephone communication network, such as a mobile telephone network, and a wireless communication network, such as Wi-Fi. The in-vehicle device 11 is connected to the delivery user terminal 200 via a network N2. Examples of the network N2 include a short-range wireless communication network. The delivery user terminal 200 is a terminal that the delivery user uses. The delivery management system 1 includes the single delivery management server 500 as an example. Alternatively, the delivery management system 1 may include two or more delivery management servers. The delivery management system 1 includes the single payment management server 600 as an example. Alternatively, the delivery management system 1 may include two or more payment management servers.

The delivery management server 500 accepts registration of an article to be delivered (hereinafter, also referred to as package) from the client user terminal 50. The client user terminal 50 is a terminal that the client user uses. For example, when the client user asks the delivery user to deliver an article, purchased on an online shopping site set up by an electronic commerce operator, as a package, the client user is allowed to register delivery information and vehicle management information into the delivery management server 500 with the use of an application. The delivery information is concerned with the package. The vehicle management information is used when a place of delivery of the package is set to the vehicle 10. The application is installed in the client user terminal 50 to use the service that is provided by the delivery management system 1. As shown in FIG. 3 (described later), the delivery information includes identification information of the client user, delivery schedule information, payment information about a fee associated with a package, and the like. The identification information of the client user is also associated in advance with the vehicle 10 associated with the client user in the delivery management server 500. The client user selects a place of delivery to use as needed from among candidates of a place of delivery concerned with the client user, including the vehicle 10. The selected place of delivery is also included in the delivery information. Hereinafter, the description will proceed on the assumption that the place of delivery, selected by the client user, is set to the vehicle 10. The delivery information further includes information about the status of a package. Information about whether delivery of a package has completed, or the like, is illustrated as the status information.

As the delivery management server 500 accepts a request to deliver a package from the client user terminal 50, and when the place of delivery of the package is the vehicle 10, the delivery management server 500 makes a request of the center server 400 to transmit authentication information to the delivery user terminal 200. The authentication information is used to lock or unlock the luggage compartment 15 of the vehicle 10 to accommodate the package. The center server 400 transmits authentication information of the vehicle 10 to the delivery user terminal 200 via the delivery management server 500 based on the identification information of the client user. The vehicle 10 is associated with the identification information of the client user. The identification information of the client user is included in the delivery information.

The delivery management system 1 is also able to collect a fee associated with a package in place of a shipper of the package. This fee associated with a package includes the price of the package or a delivery charge for the package. Hereinafter, this fee is also termed package fee. The payment management server 600 accepts a payment for the package fee from the client user terminal 50. The client user is, for example, allowed to pay the package fee to the payment management server 600 through electronic payment with the use of the application installed in the client user terminal 50. The center server 400 transmits authentication information to the delivery user terminal 200 only when the electronic payment for the package fee has been completed. Determination as to whether the electronic payment for the package fee has been completed may be carried out by the center server 400 or may be carried out by the delivery management server 500.

The delivery user locks or unlocks the luggage compartment 15 of the vehicle 10 with the use of the authentication information received by the delivery user terminal 200. Thus, the delivery user is allowed to access the luggage compartment 15 of the vehicle 10 in order to deliver the package. The authentication information is digital information that is transferred from the delivery user terminal 200 to the in-vehicle device 11 through short-range wireless communication and that causes the in-vehicle device 11 to lock or unlock the luggage compartment 15 of the vehicle 10 after undergoing an authentication process that is executed by the in-vehicle device 11.

Figure 2:
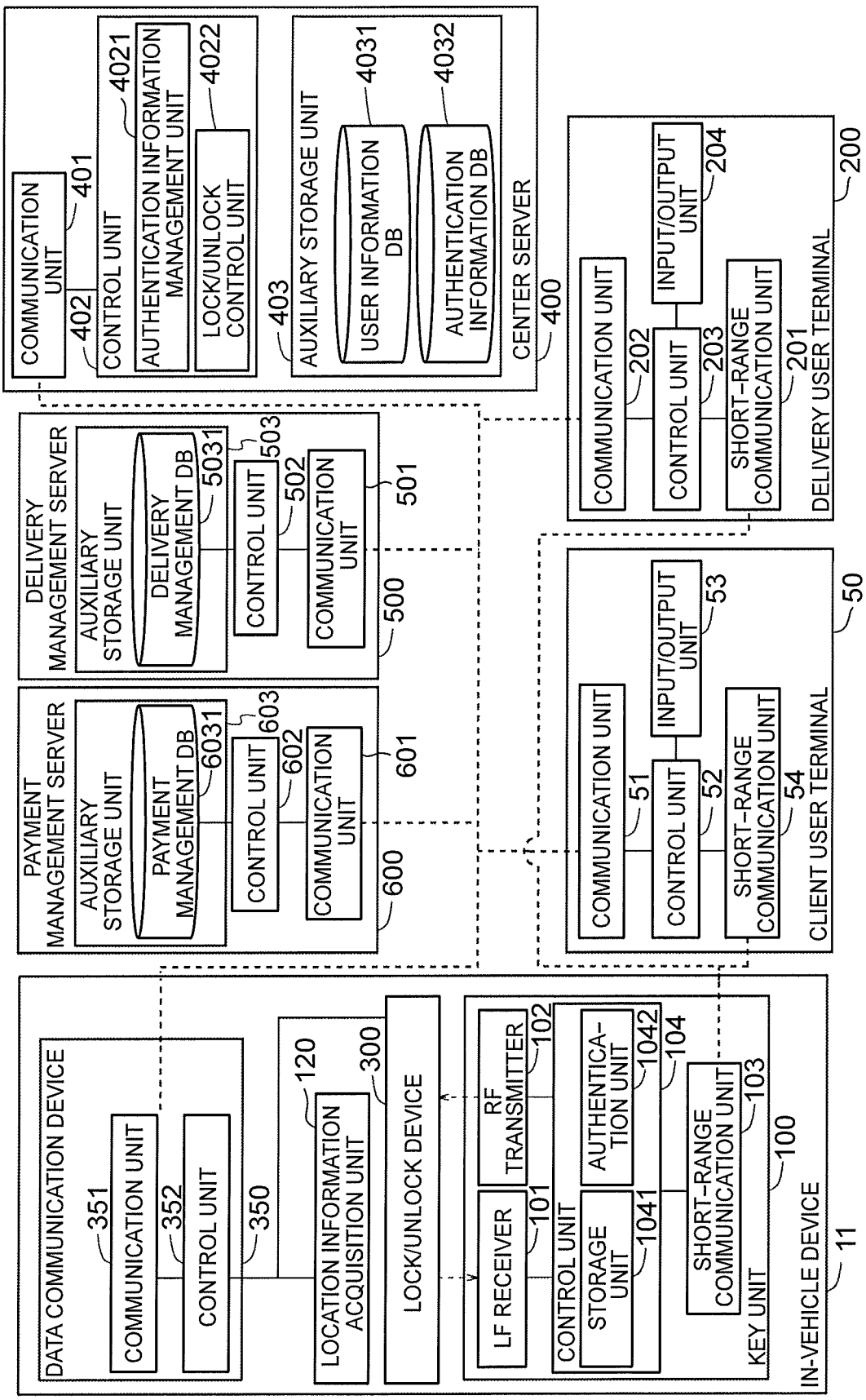
FIG. 2 is a block diagram that schematically shows an example of the configuration of the delivery management system according to the embodiment.

FIG. 2 is a block diagram that schematically shows an example of the configuration of each of the in-vehicle device 11, delivery user terminal 200, client user terminal 50, delivery management server 500, payment management server 600, and center server 400 that constitute the delivery management system 1 according to the present embodiment. The hardware configuration and functional configuration of the in-vehicle device 11, delivery user terminal 200, client user terminal 50, delivery management server 500, payment management server 600, and center server 400 will be described with reference to FIG. 2.

The in-vehicle device 11 includes a key unit 100, a lock/unlock device 300, a data communication device 350, and a location information acquisition unit 120. The lock/unlock device 300 is an example of a lock and unlock device. The key unit 100 includes a wireless interface similar to that of an electronic key of a smart key (hereinafter, mobile machine). By carrying out communication with the lock/unlock device 300 of the in-vehicle device 11, the key unit 100 is able to lock or unlock the luggage compartment 15 or passenger compartment of the vehicle 10 (which may also be referred to as that the key unit 100 is able to lock or unlock the vehicle 10 when the luggage compartment 15 and the passenger compartment do not need to be distinguished from each other) without using a physical key. The key unit 100 carries out short-range wireless communication with a mobile terminal, such as the delivery user terminal 200, and determines whether to behave as the electronic key of the vehicle 10 based on a result of the authentication process over the delivery user terminal 200.

When the delivery user terminal 200 accesses the luggage compartment 15 of the vehicle 10 in order to deliver the package, the delivery user terminal 200 gets the center server 400 to issue authentication information for locking or unlocking the luggage compartment 15 via the delivery management server 500 as described above. The authentication information transmitted from the delivery user terminal 200 to the key unit 100 is compared with authentication information prestored in the key unit 100. When the authentication process is successful, the delivery user terminal 200 is authenticated as a terminal that validly activates the in-vehicle device 11. When the delivery user terminal 200 has been authenticated, the key unit 100 transmits a key ID of the vehicle 10 associated with the authentication information to the lock/unlock device 300 together with a lock signal or an unlock signal. The key ID is prestored in the key unit 100. In the following description, the lock signal or the unlock signal is generally referred to as lock/unlock signal. The term lock/unlock signal represents at least any one of the lock signal and the unlock signal. The lock/unlock device 300 locks or unlocks the vehicle 10 when the key ID received from the key unit 100 coincides with a key ID prestored in the lock/unlock device 300.

The lock/unlock device 300 is a device for locking or unlocking the doors of the passenger compartment of the vehicle 10 or the luggage compartment door 16 of the vehicle 10. For example, the lock/unlock device 300 locks or unlocks the doors of the vehicle 10 in response to a lock signal or unlock signal that is transmitted from the mobile machine corresponding to the vehicle 10 via radio frequency (hereinafter, referred to as RF) waves. The lock/unlock device 300 also has the function of transmitting low-frequency (hereinafter, referred to as LF) waves for searching for the mobile machine.

In the present embodiment, instead of the above-described mobile machine, the key unit 100 controls locking and unlocking of the doors of the vehicle 10 by exchanging RF waves and LF waves with the lock/unlock device 300. Hereinafter, unless otherwise specified, description will be made on the assumption that a communication destination of the lock/unlock device 300 is limited to the key unit 100.

The key unit 100 is a device disposed at a predetermined location (for example, in a glove box) in the passenger compartment of the vehicle 10. The key unit 100 has the function of authenticating the delivery user terminal 200, or the like, by carrying out short-range wireless communication with the delivery user terminal 200, or the like, and the function of transmitting a lock/unlock signal with the use of RF waves based on a result of the authentication. The key unit 100 includes an LF receiver 101, an RF transmitter 102, a short-range communication unit 103, and a control unit 104.

The LF receiver 101 is a device that receives a polling signal that is transmitted from the lock/unlock device 300 via LF waves. The RF transmitter 102 is a device that transmits a lock/unlock signal to the lock/unlock device 300 via RF waves.

The short-range communication unit 103 is a device that carries out communication with the delivery user terminal 200. The short-range communication unit 103 carries out communication within a short range (to such an extent that communication is available between the inside of the passenger compartment and the outside of the passenger compartment) with the use of predetermined wireless communication standards. In the present embodiment, the short-range communication unit 103 carries out data communication based on Bluetooth (registered trademark) low energy (hereinafter, BLE), Near field communication (NFC), Ultra wideband (UWB), Wi-Fi (registered trademark), or the like.

The control unit 104 is a computer that executes control for authenticating the delivery user terminal 200 by carrying out short-range wireless communication with the delivery user terminal 200 via the short-range communication unit 103, and that also executes control for transmitting a lock/unlock signal based on a result of the authentication.

The control unit 104 includes a storage unit 1041 and an authentication unit 1042. A control program for controlling the key unit 100 is stored in the storage unit 1041. The control unit 104 may implement various functions including the authentication unit 1042 by executing control programs stored in the storage unit 1041 on a CPU (not shown). For example, the control unit 104 implements the function of receiving via the LF receiver 101 a polling signal transmitted from the lock/unlock device 300 as LF waves, the function of transmitting a lock/unlock signal to the lock/unlock device 300 via the RF transmitter 102 as RF waves, the function of processing communication with the delivery user terminal 200, which is carried out via the short-range communication unit 103, the function of generating a lock/unlock signal in the case where authentication of the delivery user terminal 200 by the authentication unit 1042 is successful, and the like.

The authentication unit 1042 authenticates the delivery user terminal 200 based on the authentication information included in a lock request or unlock request (hereinafter, generally referred to as lock/unlock request) transmitted from the delivery user terminal 200. Specifically, the authentication unit 1042 compares the authentication information stored in the storage unit 1041 with the authentication information transmitted from the delivery user terminal 200. When these pieces of authentication information have a predetermined relation, the authentication unit 1042 determines that authentication is successful. When both pieces of authentication information do not have the predetermined relation, the authentication unit 1042 determines that authentication has failed. The predetermined relation includes not only the case where the authentication information stored in the storage unit 1041 and the authentication information transmitted from the delivery user terminal 200 match each other but also the case where results of a process, such as predetermined encryption and decryption, using the two pieces of authentication information match each other, the case where a result obtained by decrypting one of the two pieces of authentication information matches the other one of the two pieces of authentication information, and the like.

When the authentication unit 1042 succeeds in authentication of the delivery user terminal 200, a lock/unlock signal generated in response to a request received from the delivery user terminal 200 is transmitted to the lock/unlock device 300 via the RF transmitter 102. Hereinafter, as the need for description arises, the authentication information that is stored in the key unit 100 may be referred to as device authentication information, and the authentication information that is transmitted from the delivery user terminal 200, or the like, may be referred to as terminal authentication information. The key unit 100 transmits the key ID to the lock/unlock device 300 together with a lock/unlock signal.

In this way, the in-vehicle device 11 executes a series of processes. That is, the in-vehicle device 11 activates the lock/unlock device 300 through the authentication process that is executed by the key unit 100 as the authentication information is transmitted from the delivery user terminal 200, and locks or unlocks the passenger compartment or luggage compartment 15 of the vehicle 10.

The in-vehicle device 11 includes the data communication device 350. The data communication device 350 is a communication device that is connected to the center server 400 via the network N1 and that is able to exchange data with the center server 400. The data communication device 350 includes a communication unit 351 and a control unit 352. The communication unit 351 is a communication module for connecting the in-vehicle device 11 to the network N1. In the present embodiment, the communication unit 351 is able to carry out communication with another device (for example, the center server 400, or the like) via the network N1 by using a mobile communication service, such as 3rd generation (3G) and long term evolution (LTE). The control unit 352 is a computer that governs control over the data communication device 350. The control unit 352 executes, for example, a process of transmitting the location information of the vehicle 10 to the center server 400. The control unit 352 is formed of, for example, a microcomputer. The control unit 352 implements functions for executing the above-described various processes by executing programs stored in a storage device (such as a ROM) (not shown) on a CPU (not shown).

The in-vehicle device 11 includes the location information acquisition unit 120. The location information acquisition unit 120 acquires the location information of the vehicle 10. The location information acquisition unit 120 acquires the current location of the vehicle 10 with the use of global positioning system (GPS), or the like. The location information acquired by the location information acquisition unit 120 is transmitted to the center server 400 via the data communication device 350 together with the key ID. Therefore, the center server 400 is able to acquire the location of the vehicle 10.

Next, the delivery user terminal 200 will be described. The delivery user terminal 200 is a small computer. Examples of the small computer include a smart phone, a cellular phone, a tablet terminal, a personal information terminal, and a wearable computer (such as a smart watch). The delivery user terminal 200 may be a personal computer (PC) that is connected to the delivery management server 500 via the network N1, such as the Internet that is a public telecommunication network. The delivery user terminal 200 includes a short-range communication unit 201, a communication unit 202, a control unit 203, and an input/output unit 204.

The short-range communication unit 201 is a module that carries out communication with the key unit 100 with the use of the same communication standards as the short-range communication unit 103 of the key unit 100. A network that is established between the short-range communication unit 201 and the key unit 100 is denoted by N2 in FIG. 1. The communication unit 202 is a communication module for connecting the delivery user terminal 200 to the network N1. In the present embodiment, the communication unit 202 is able to carry out communication with another device (for example, the delivery management server 500, or the like) via the network N1 by using a mobile communication service, such as 3rd generation (3G) and long term evolution (LTE).

The control unit 203 is a computer that governs control over the delivery user terminal 200. The control unit 203 executes, for example, a process of acquiring the above-described terminal authentication information, a process of generating a lock/unlock request including the acquired terminal authentication information, a process of transmitting the generated lock/unlock request to the key unit 100, and the like. The control unit 203 is formed of, for example, a microcomputer. The control unit 203 implements functions for executing the above-described various processes by executing programs stored in a storage device (such as a ROM) (not shown) on a CPU (not shown).

The control unit 203 makes an interaction with the delivery user via the input/output unit 204. The input/output unit 204 is a module that accepts an input operation made by the delivery user and provides information to the delivery user. Specifically, the input/output unit 204 is formed of a touch panel, a control unit of the touch panel, a liquid crystal display, and a control unit of the liquid crystal display. In the present embodiment, the touch panel and the liquid crystal display are integrated into a single touch panel display.

The control unit 203 displays an operation page on the input/output unit 204, and generates a lock/unlock request based on an operation made by the delivery user. For example, the control unit 203 outputs an icon for unlocking the doors, an icon for locking the doors, and the like, on the touch panel display, and generates an unlock request or a lock request based on an operation made by the delivery user. The operation that is performed by the delivery user is not limited to an operation via the touch panel display. The operation may be performed via, for example, a hardware switch, or the like.

The control unit 203 executes a process of acquiring terminal authentication information from the center server 400. The terminal authentication information is not information (key ID) for the lock/unlock device 300 to authenticate the key unit 100. The terminal authentication information is information for the key unit 100 to authenticate the delivery user terminal 200 (for example, authentication information corresponding to the authentication information unique to the key unit 100 mounted on the vehicle 10). Specifically, the control unit 203 transmits a request to issue terminal authentication information to the center server 400 via the delivery management server 500. The request to issue terminal authentication information includes the identification information of the delivery user terminal 200 and a signal making a request to issue terminal authentication information unique to the key unit 100. As the center server 400 receives a request to issue terminal authentication information, the center server 400 acquires terminal authentication information unique to the key unit 100 mounted on the vehicle 10, and transmits the acquired terminal authentication information to the delivery user terminal 200 via the delivery management server 500. Thus, an operation to unlock the vehicle 10 with the use of the delivery user terminal 200 is enabled. When the delivery user terminal 200 has no terminal authentication information, a lock operation and an unlock operation through the operation page are disabled.

In the present embodiment, terminal authentication information that the delivery user terminal 200 acquires is a one-time key. The one-time key is invalidated as the luggage compartment door 16 is locked subsequent to completion of delivery user's delivery. For example, at the timing at which terminal authentication information that is transmitted from the center server 400 has been received by the delivery user terminal 200, the terminal authentication information is stored in a storage unit (not shown) of the delivery user terminal 200. After that, at the timing at which a lock notification that is transmitted from the key unit 100 when the luggage compartment door 16 is locked subsequent to completion of delivery has been received by the delivery user terminal 200, the terminal authentication information is erased from the storage unit.

The timing at which the terminal authentication information stored in the storage unit of the delivery user terminal 200 is erased is not limited to the above-described example. The timing may be the timing after a lapse of a predetermined time from a point in time at which the delivery user terminal 200 has received terminal authentication information that is transmitted from the center server 400 (or a point in time at which the center server 400 has transmitted terminal authentication information toward the delivery user terminal 200). Old terminal authentication information stored in the delivery user terminal 200 may be erased at a point in time at which the delivery user terminal 200 has received new terminal authentication information from the center server 400. The terminal authentication information is not limited to the above-described one-time key. The terminal authentication information may be a time-limited key that is enabled only in a predetermined time period. Irrespective of whether the terminal authentication information is a one-time key or a time-limited key, device authentication information corresponding to the terminal authentication information is stored in the key unit 100 in advance.

Next, the client user terminal 50 will be described. The client user terminal 50, as well as the delivery user terminal 200, may also be a small computer. Examples of the small computer include a smart phone, a cellular phone, a tablet terminal, a personal information terminal, and a wearable computer (such as a smart watch). The client user terminal 50 may be a personal computer. The client user terminal 50 includes a communication unit 51, a control unit 52, an input/output unit 53, and a short-range communication unit 54.

The communication unit 51 is a communication module for a connection to the network N1. The communication unit 51 is functionally equivalent to the communication unit 202. The control unit 52 is a computer that governs control over the client user terminal 50. The control unit 52 is formed of, for example, a microcomputer. The control unit 52 implements functions for executing various processes by executing programs stored in a storage device (such as a ROM) (not shown) on a CPU (not shown). The input/output unit 53 is also a module that accepts an input operation made by the client user and provides information to the client user. The input/output unit 53 is functionally similar to the input/output unit 204.

The short-range communication unit 54 is a module that carries out communication with the key unit 100 by using the same communication standards as the short-range communication unit 103. The control unit 52 activates the lock/unlock device 300 from the client user terminal 50 by transmitting the terminal authentication information to the key unit 100 via the short-range communication unit 54 through short-range wireless communication. The client user terminal 50 that is used to make a request of the delivery management server 500 to deliver a package and the client user terminal 50 that is used to make a request of the payment management server 600 to make a payment may be the same terminal or may be different terminals.

Next, the delivery management server 500 will be described. The delivery management server 500 has a general computer configuration. When a plurality of delivery service providers participate in the delivery management system 1, each of the delivery service providers prepares at least one delivery management server as its own management server. The delivery management server 500 is a computer that includes a processor (not shown), a main storage unit (not shown), and an auxiliary storage unit 503. Examples of the processor include a central processing unit (CPU) and a digital signal processor (DSP). Examples of the main storage unit include a random access memory (RAM) and a read only memory (ROM). Examples of the auxiliary storage unit 503 include an erasable programmable ROM (EPROM), a hard disk drive (HDD), and removable media.

Examples of the removable media include a universal serial bus (USB) memory and a disk recording medium, such as a compact disc (CD) and a digital versatile disc (DVD). The auxiliary storage unit 503 stores an operating system (OS), various programs, various tables, and the like. The programs stored in the auxiliary storage unit 503 are loaded onto a working area of the main storage unit, the loaded programs are executed, and components, and the like, are controlled through execution of the programs. Thus, functions that agree to a predetermined purpose are implemented.

The delivery management server 500 further includes a communication unit 501. The communication unit 501 establishes a connection with other devices. The communication unit 501 carries out communication between the delivery management server 500 and the other devices (for example, the center server 400, the delivery user terminal 200, the client user terminal 50, and the like). The communication unit 501 is, for example, a local area network (LAN) interface board, or a wireless communication circuit for wireless communication. The LAN interface board or the wireless communication circuit is connected to the network N1, such as the Internet that is a public telecommunication network.

The delivery management server 500 includes a delivery management database (DB) 5031. The delivery management DB 5031 stores the above-described delivery information. The delivery management DB 5031 is constructed such that delivery information is stored in the auxiliary storage unit 503. In the delivery management DB 5031, a client user and delivery information are associated with each other. The delivery management DB 5031 is constructed such that the program of a database management system (DBMS), which is executed by the processor, manages data stored in the auxiliary storage unit 503.

The configuration of delivery information that is stored in the delivery management DB 5031 will be described with reference to FIG. 3. FIG. 3 illustrates the configuration of a delivery information table. The delivery information table contains a client user ID field, a delivery date field, a place of delivery field, a delivery status field, a package attribute field, a payment method field, and a payment status field. Identification information for identifying a client user is input to the client user ID field. Information that indicates a date on which a package is delivered is input to the delivery date field. Information that indicates whether delivery of a package by a delivery user has completed is input to the delivery status field. For example, information for identifying a package, such as weight and size, associated with the package, or an ID assigned to a package (hereinafter, also referred to as package ID) is input to the package attribute field. Information for determining whether a payment for a package fee is made by the client user at the time of arrival of a package or a payment for a package fee is made by a shipper at the time of shipment of a package is input to the payment method field. When there is specification that the client user pays for a package fee, "At time of arrival" is input to the payment method field. When there is specification that the shipper pays for a package fee, "At time of shipment" is input to the payment method field. Information that is input to the payment method field is included in a signal that is transmitted from the client user terminal 50 to the delivery management server 500 when the client user terminal 50 makes a request of the delivery management server 500 to deliver a package. Information that indicates whether a payment for a package fee has been completed is input to the payment status field. When the shipper pays for a package fee, a package is shipped after a payment for the package fee has been completed, so the payment status is always input as completed.

In the delivery management server 500, a control unit 502 is implemented as a functional unit when the above-described processor executes a program. The control unit 502 executes management control, such as registration of delivery information in the delivery management DB 5031 and update of delivery information in the delivery management DB 5031. For example, when the client user submits a request to deliver a package via the client user terminal 50, the control unit 502 generates delivery information corresponding to the client user by associating a delivery date, a place of delivery, a payment method, and the like, with the identification information of the client user, and stores the delivery information in the delivery management DB 5031. After the control unit 502 generates the delivery information, when a notification of a change of information about the delivery date or place of delivery has been provided from the client user, the control unit 502 updates the stored delivery information in accordance with the change. The control unit 502 carries out communication with the delivery user terminal 200 via the communication unit 501, and updates information about the status of the package, included in the delivery information. For example, the control unit 502 receives status information (for example, information that indicates completion of delivery) input via the input/output unit 204 by the delivery user from the delivery user terminal 200, and updates the corresponding delivery information.

The delivery management DB 5031 also stores vehicle management information that associates a client user with a vehicle 10 as a place of delivery. The configuration of the vehicle management information will be described with reference to FIG. 4. FIG. 4 illustrates the configuration of a vehicle management information table. The vehicle management information table contains a client user ID field, a vehicle type field, a color field, a license number field, and a vehicle location field. Pieces of information for identifying a vehicle 10 (vehicle type, the color of the vehicle, and the license number of the vehicle) are respectively input to the vehicle type field, the color field, and the license number field so that a delivery user is able to find the vehicle 10 when a client user selects the vehicle 10 as a place of delivery. Location information about a location at which the vehicle 10 is located is input to the vehicle location field. The location information of the vehicle 10 may be transmitted from the center server 400 to the delivery management server 500 or may be input by the client user via the client user terminal 50.

The control unit 502 transmits an instruction about delivery to the delivery user terminal 200 so that the delivery user is able to deliver a package to the vehicle 10 based on the delivery information and vehicle management information associated with the client user. Any functional component of the delivery management server 500 or part of the processes of the functional components may be executed by another computer that is connected to the network N1. A series of processes that are executed by the delivery management server 500 may be executed by hardware or may be executed by software.

Next, the center server 400 will be described. The center server 400 also has a general computer configuration. The basic hardware configuration of the center server 400 is the same as that of the delivery management server 500. The center server 400 includes a processor (not shown), a main storage unit (not shown), and an auxiliary storage unit 403.

Programs stored in the auxiliary storage unit 403 are loaded onto a working area of the main storage unit, the loaded programs are executed, and components, and the like, are controlled through execution of the programs. Thus, functions that agree to a predetermined purpose are implemented. The center server 400 also includes a communication unit 401. The communication unit 401 is functionally equivalent to the communication unit 501 of the delivery management server 500. The communication unit 401 carries out communication between the center server 400 and other devices (for example, the delivery management server 500, the client user terminal 50, and the like).

The auxiliary storage unit 403 of the center server 400 includes a user information DB 4031 and an authentication information DB 4032. The user information DB 4031 and the authentication information DB 4032 store various pieces of information. These databases (DBs) are constructed such that the program of a database management system, which is executed by the processor, manages data stored in the auxiliary storage unit 403.

The user information DB 4031 stores identification information of users (for example, the delivery user and the client user) who use the vehicle 10, corresponding passwords, and the like. The authentication information DB 4032 stores authentication information of the vehicle 10. The authentication information corresponds to the above-described terminal authentication information. The authentication information of the vehicle 10 is information associated with the identification information (key ID) of the vehicle 10, and may be, for example, identification information unique to the key unit 100 of the in-vehicle device 11. The authentication information DB 4032 may store not only the authentication information of the vehicle 10 but also information, such as an effective period (including effective time period) of the authentication information, and whether authentication information is invalid. The effective period of authentication information may be transmitted to the delivery user terminal 200 together with the authentication information. When the delivery user terminal 200 receives the effective period of authentication information, the delivery user terminal 200 is able to invalidate the authentication information of which the effective period has expired by deleting the authentication information. Whether authentication information is invalid indicates the status of whether the authentication information is effective when transmitted to the delivery user terminal 200, and whether the effective period of the authentication information has expired and is invalid.

In the center server 400, a control unit 402 is implemented as a functional unit when the above-described processor executes a program. The control unit 402 executes control related to issuance of authentication information to the delivery user terminal 200, or the like. More specifically, the control unit 402 includes an authentication information management unit 4021 and a lock/unlock control unit 4022 as functional units.

The authentication information management unit 4021 manages issuance of authentication information for locking or unlocking the vehicle 10. More specifically, the authentication information management unit 4021 accepts a request to issue authentication information for locking or unlocking the vehicle 10 from the delivery management server 500. The authentication information management unit 4021 receives information about the delivery user terminal 200 and information input in the payment method field together with a request to issue the authentication information. The delivery user terminal 200 is a destination of the authentication information. The authentication information management unit 4021 transmits the authentication information (terminal authentication information) corresponding to the key unit 100 to the delivery user terminal 200 via the delivery management server 500.

The lock/unlock control unit 4022 executes a predetermined process such that a package is not delivered when a payment for a package fee has not been completed in the case where there is specification that the client user pays for the package fee. The predetermined process is associated with authentication information that is issued by the authentication information management unit 4021. As the predetermined process, the lock/unlock control unit 4022 executes a process of not permitting issuance of authentication information from the authentication information management unit 4021 to the delivery user terminal 200 until an electronic payment for the package fee has been completed. That is, even when the delivery management server 500 transmits a request to issue authentication information to the center server 400, but when a payment for the package fee has not been completed, the lock/unlock control unit 4022 does not permit the authentication information management unit 4021 to issue authentication information. When a payment for the package fee has been completed, the lock/unlock control unit 4022 permits the authentication information management unit 4021 to issue authentication information. When issuance of authentication information is not permitted, the lock/unlock control unit 4022 may provide the delivery management server 500 with a notification that issuance of authentication information is not permitted.

Next, the payment management server 600 will be described. The payment management server 600 also has a general computer configuration. The basic hardware configuration of the payment management server 600 is the same as that of the delivery management server 500. The payment management server 600 includes a processor (not shown), a main storage unit (not shown), and an auxiliary storage unit 603. Programs stored in the auxiliary storage unit 603 are loaded onto a working area of the main storage unit, the loaded programs are executed, and components, and the like, are controlled through execution of the programs. Thus, functions that agree to a predetermined purpose are implemented. The payment management server 600 also includes a communication unit 601. The communication unit 601 is functionally equivalent to the communication unit 501 of the delivery management server 500. The communication unit 601 carries out communication between the payment management server 600 and other devices (for example, the delivery management server 500, the client user terminal 50, and the like).

The payment management server 600 includes a payment management database (DB) 6031. The payment management DB 6031 stores information about electronic payments for package fees. The payment management DB 6031 is constructed such that information about payments (hereinafter, also referred to as payment information) is stored in the auxiliary storage unit 603. In the payment management DB 6031, a client user ID and payment information are associated with each other. The payment management DB 6031 is constructed such that the program of a database management system (DBMS), which is executed by the processor, manages data stored in the auxiliary storage unit 603.

In the payment management server 600, a control unit 602 is implemented as a functional unit when the above-described processor executes a program. As the control unit 602 receives a request for an electronic payment for a package fee from the client user terminal 50, the control unit 602 makes an electronic payment in response to the request. The control unit 602 executes management control, such as registration of payment information into the payment management DB 6031. For example, as a payment for a package fee has been completed, the control unit 602 generates payment information corresponding to the client user, and stores the payment information in the payment management DB 6031. The control unit 602 carries out communication with the center server 400, the delivery management server 500, or the like, via the communication unit 601, and transmits the payment information (which may be the payment status in FIG. 3). This transmission of payment information may be performed when a request has been made from the center server 400, the delivery management server 500, or the like, or may be performed when a payment has been completed even when there is no such request. In the present embodiment, the control unit 602 of the payment management server 600, which makes a payment for a package fee, may be regarded as a control unit of the disclosure or a first control unit of the disclosure.

Any functional component of the payment management server 600 or part of the processes of the functional components may be executed by another computer that is connected to the network N1. A series of processes that are executed by the payment management server 600 may be executed by hardware or may be executed by software.

Figure 5:
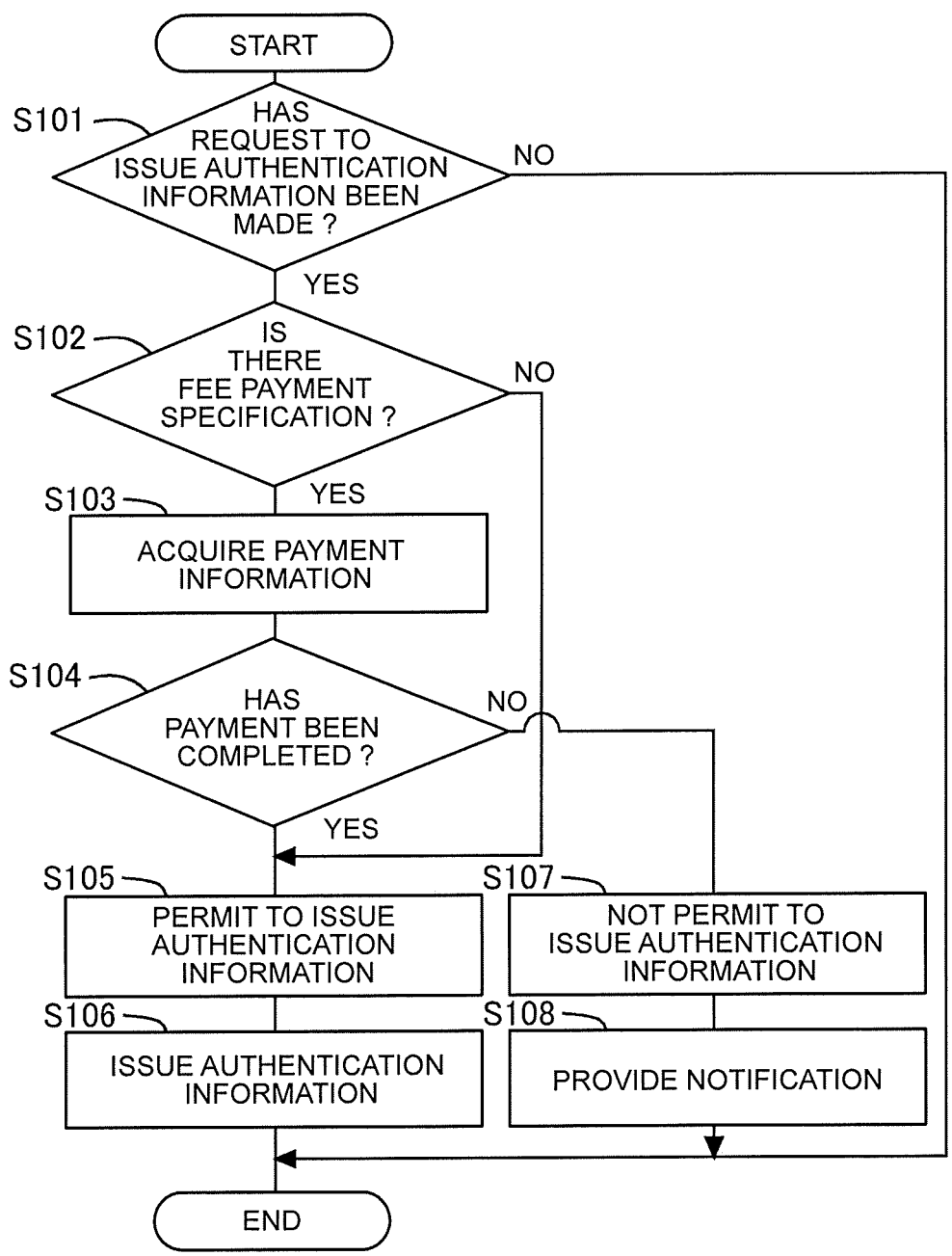
FIG. 5 is a flowchart that shows the flow of authentication information issuance control.

Next, FIG. 5 is a flowchart that shows the flow of control until the center server 400 issues authentication information (authentication information issuance control). The authentication information issuance control shown in FIG. 5 is repeatedly executed by the center server 400 at predetermined time intervals. Initially, in S101, it is determined whether the authentication information management unit 4021 has received a request to issue authentication information from the delivery management server 500. When affirmative determination is made in S101, the process proceeds to S102. When negative determination is made in S101, the authentication information issuance control is ended. A client user ID and a package ID, corresponding to a package to be delivered, are associated with a request to issue authentication information from the delivery management server 500.

In S102, the authentication information management unit 4021 determines whether there is specification that the client user pays for a package fee at the time of delivery of the package. Hereinafter, this specification is also referred to as fee payment specification. This fee payment specification is transmitted from the client user terminal 50 to the delivery management server 500 together with the request to deliver the package. When fee payment specification is associated with a package ID, the delivery management server 500 may determine whether there is fee payment specification based on the package ID. The fee payment specification is transmitted from the delivery management server 500 to the center server 400 together with a request to issue authentication information. When affirmative determination is made in S102, the process proceeds to S103. When negative determination is made in S102, the process proceeds to S105. In S103, the lock/unlock control unit 4022 acquires payment information. The lock/unlock control unit 4022 transmits, to the payment management server 600, a signal making a request to transmit payment information, and acquires the payment information from the payment management server 600. In S104, the lock/unlock control unit 4022 determines whether an electronic payment for the package fee has been completed. When affirmative determination is made in S104, the process proceeds to S105. When negative determination is made in S104, the process proceeds to S107.

In S105, the lock/unlock control unit 4022 permits the authentication information management unit 4021 to issue authentication information. Subsequently, in S106, the authentication information management unit 4021 issues authentication information. When the authentication information has been issued, the lock/unlock control unit 4022 may transmit payment completion information to the delivery management server 500 together with the authentication information. This payment completion information is information that indicates that a payment for the package fee has been completed. On the other hand, when negative determination is made in S104 and the process proceeds to S107, the lock/unlock control unit 4022 does not permit the authentication information management unit 4021 to issue authentication information in S107. As a result, in subsequent S108, the lock/unlock control unit 4022 provides the delivery management server 500, which has transmitted a request to issue authentication information, with a notification that issuance of authentication information is not permitted.

Figure 6:
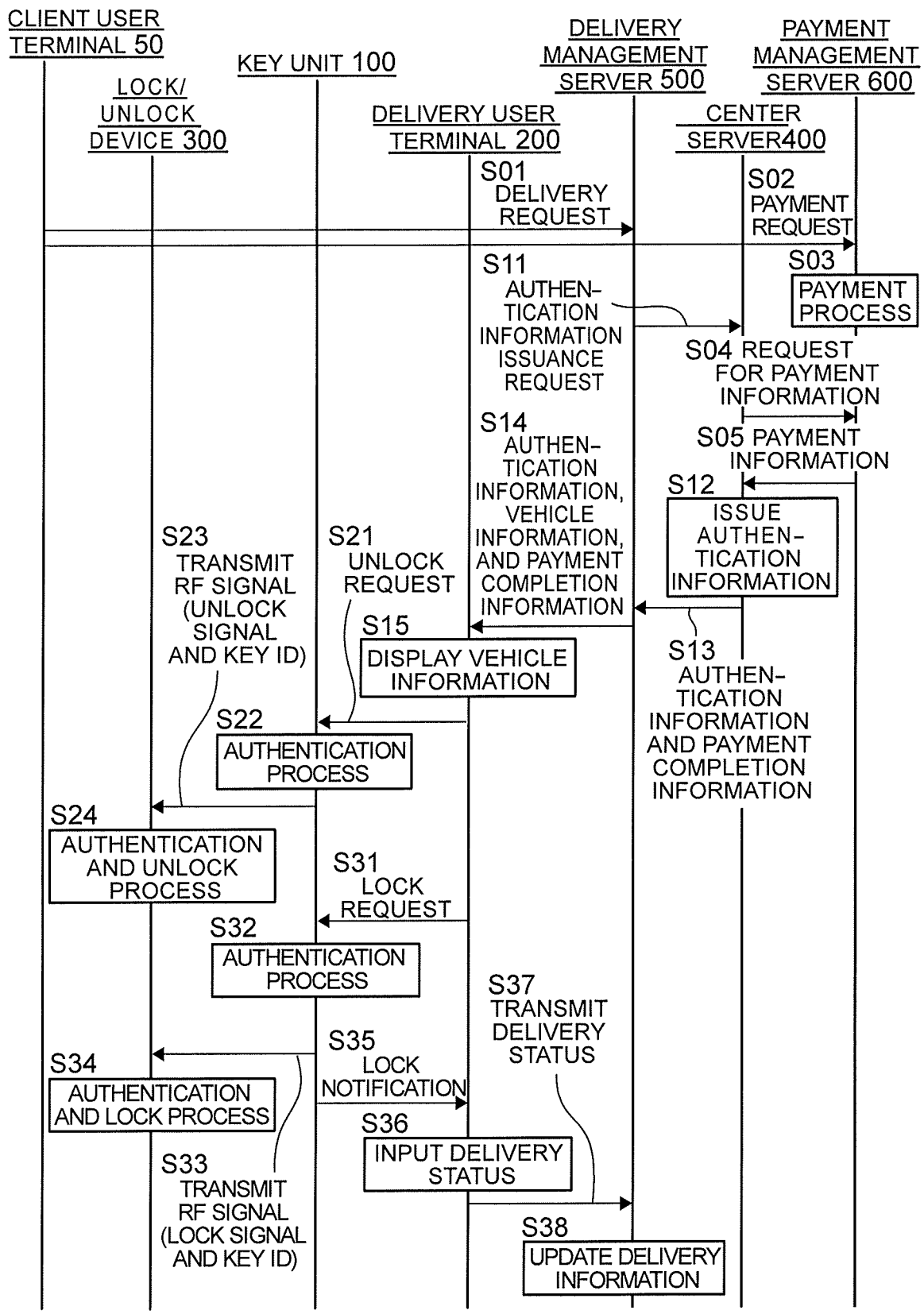
FIG. 6 is a view that shows the flow of operations of the delivery management system.

Next, the operations of the delivery management system 1 will be described with reference to FIG. 6. In the flow shown in FIG. 6, the client user terminal 50 transmits, to the delivery management server 500, a signal making a request to deliver a package to the luggage compartment 15 of the vehicle 10 (the process of S01). The client user terminal 50 transmits, to the payment management server 600, a signal making a request to pay for a package fee (the process of S02). The process of S01 and the process of S02 may be transposed. The payment management server 600 makes an electronic payment for the package fee upon reception of a request for a payment from the client user terminal 50 (the process of S03). As the electronic payment is made, the payment management DB 6031 is updated.

On the other hand, when the delivery management server 500 receives a request to deliver a package to the vehicle 10 from the client user terminal 50, the delivery management server 500 makes a request of the center server 400 to issue authentication information corresponding to the vehicle 10 (S11). The payment method shown in FIG. 3 is included in a signal that is transmitted at the time of this request. As the center server 400 receives the signal making a request to issue authentication information from the delivery management server 500, the center server 400 transmits a signal making a request for payment information to the payment management server 600 (the process of S04). The payment management server 600 that has received this signal transmits the payment information to the center server 400 (the process of S05). The center server 400 determines whether a payment has been completed based on the received payment information, and issues the requested authentication information of the vehicle 10 when a payment has been completed (the process of S12). In S13, the center server 400 transmits the authentication information and the payment completion information to the delivery management server 500. In S14, the delivery management server 500 transmits the authentication information, vehicle information, and the payment completion information to the delivery user terminal 200. The vehicle information is information for allowing the delivery user to find the vehicle 10 as in the case of the vehicle management information shown in FIG. 4. In the present embodiment, the authentication information management unit 4021 of the center server 400 issues authentication information to the delivery user terminal 200 via the delivery management server 500. The authentication information management unit 4021 may be regarded as the control unit of the disclosure or a second control unit of the disclosure. As the delivery user terminal 200 receives the vehicle information and the payment completion information, text, images, and the like, based on the vehicle information and the payment completion information are displayed on the touch panel display of the delivery user terminal 200 (the process of S15). For example, as the control unit 203 of the delivery user terminal 200 receives the payment completion information, the control unit 203 displays "This delivery is freight collect, and payment has been completed (electronic payment)", or the like, on the touch panel display of the delivery user terminal 200. The delivery user moves to a place where the vehicle 10 is located, in accordance with the vehicle information displayed on the touch panel display. As the authentication information transmitted from the center server 400 has been received by the delivery user terminal 200, it is possible to lock or unlock the luggage compartment 15 of the vehicle 10 with the use of the delivery user terminal 200.

Subsequently, in S21 to S24, a process for unlocking the luggage compartment 15 of the vehicle 10 with the use of the delivery user terminal 200 is executed. When the processes of S21 to S24 are executed, it is assumed that the delivery user terminal 200 is moved by the delivery user to a location at which short-range wireless communication between the key unit 100 of the vehicle 10 and the delivery user terminal 200 is able to be established.

As the delivery user performs an operation to unlock the vehicle 10 via the input/output unit 204 of the delivery user terminal 200, the delivery user terminal 200 transmits an unlock request including the authentication information to the key unit 100 in S21. As the key unit 100 receives the unlock request transmitted from the delivery user terminal 200, the key unit 100 executes an authentication process in S22 by comparing the authentication information (terminal authentication information) included in the unlock request with the authentication information (device authentication information) stored in the storage unit 1041. When authentication of both pieces of authentication information is successful, the key unit 100 transmits an unlock signal and the key ID to the lock/unlock device 300 in S23. As the lock/unlock device 300 receives the unlock signal and key ID transmitted from the key unit 100, the lock/unlock device 300 executes an authentication process based on the received key ID in S24. When authentication is successful, the luggage compartment 15 of the vehicle 10 is unlocked. At this time, the lock/unlock device 300 may, for example, answer back to the key unit 100.

In S31 to S38, a process for locking the vehicle 10 with the use of the delivery user terminal 200 and a process related to the locking are executed. As the delivery user opens the luggage compartment door 16 through the unlocking process, closes the luggage compartment door 16 after predetermined delivery, and performs an operation to lock the vehicle 10 via the input/output unit 204 of the delivery user terminal 200, the delivery user terminal 200 transmits a lock request including the authentication information to the key unit 100 in S31. As the key unit 100 receives the lock request transmitted from the delivery user terminal 200, the key unit 100 executes an authentication process in S32 by comparing the authentication information (terminal authentication information) included in the lock request transmitted from the delivery user terminal 200 with the authentication information (device authentication information) stored in the storage unit 1041. When authentication of both pieces of authentication information is successful, the key unit 100 transmits a lock signal and the key ID to the lock/unlock device 300 in S33. As the lock/unlock device 300 receives the lock signal and key ID transmitted from the key unit 100, the lock/unlock device 300 executes an authentication process based on the received key ID in S34. When authentication is successful, the luggage compartment 15 of the vehicle 10 is locked. After the key unit 100 transmits the lock signal to the lock/unlock device 300, the key unit 100 transmits a notification of completion of locking (lock notification) to the delivery user terminal 200 (the process of S35). Thus, the notification of completion of locking is output on the touch panel display of the delivery user terminal 200.

As the delivery user recognizes completion of delivery of the package through the lock notification, the delivery user inputs the latest delivery status, that is, the status that delivery has completed, via the input/output unit 204 of the delivery user terminal 200 in order to update the delivery status in the delivery information stored in the delivery management server 500 (the process of S36). Thus, the latest delivery status is transmitted from the delivery user terminal 200 to the delivery management server 500 (the process of S37). In the delivery management server 500 that has received the latest delivery status, the control unit 502 updates the delivery information (the process of S38). For update of the delivery status, instead of inputting information for the update by the delivery user, as the delivery user terminal 200 receives a lock notification from the key unit 100, the delivery user terminal 200 may subsequently output an update instruction to the delivery management server 500 such that the delivery status becomes completion of delivery. When the authentication information used by the delivery user terminal 200 for this delivery is a one-time key, the authentication information acquired in S14 may be invalidated at the timing at which the delivery user terminal 200 has received a lock notification in the process of S35. That is, the authentication information stored in the storage unit of the delivery user terminal 200 may be erased from the delivery user terminal 200 at the timing at which the delivery user terminal 200 has received a lock notification.

In the above description, part or all of the functions of the center server 400 or the payment management server 600 may be implemented in the delivery management server 500, and part or all of the functions of the delivery management server 500 or the payment management server 600 may be implemented in the center server 400. The center server 400, the delivery management server 500, and the payment management server 600 may be integrated with one another.

Figure 7:
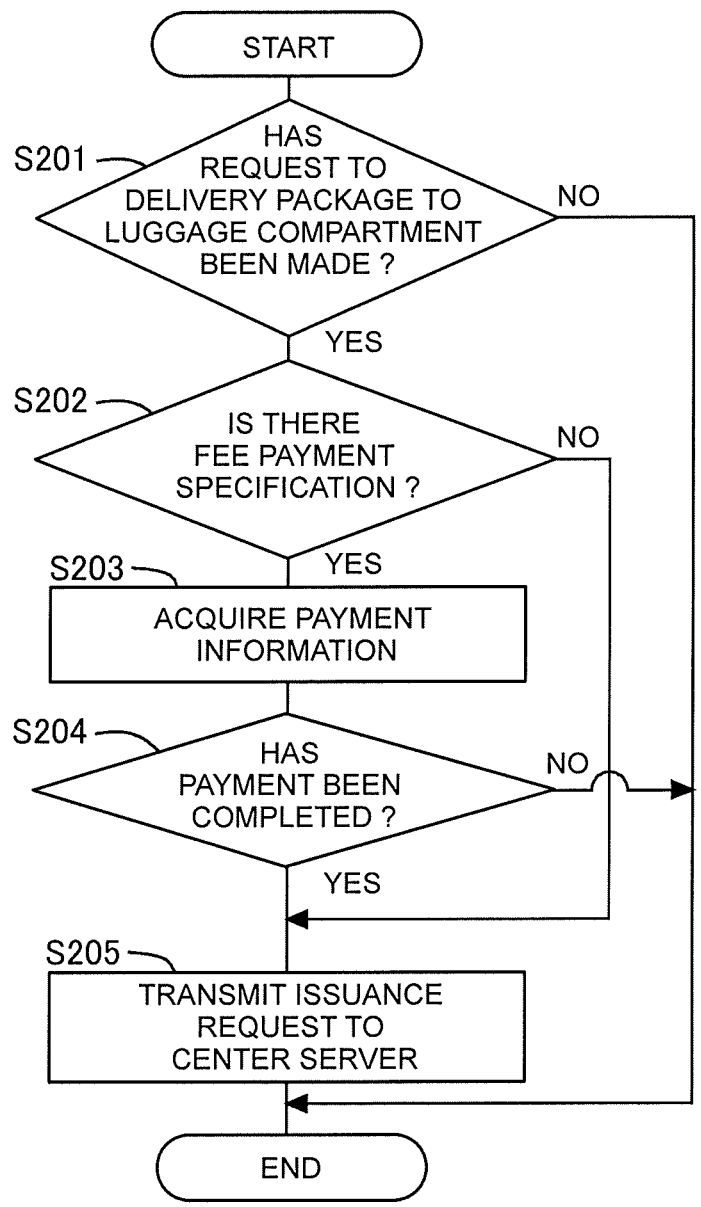
FIG. 7 is a flowchart that shows the flow of authentication information request control.

For example, in the above description, the center server 400 determines whether a payment for a package fee has been completed. Instead of the center server 400, the delivery management server 500 may determine whether a payment for a package fee has been completed. FIG. 7 is a flowchart that shows the flow of control until the delivery management server 500 makes a request of the center server 400 to issue authentication information (authentication information request control) when the delivery management server 500 determines whether a payment has been completed. The flowchart shown in FIG. 7 is repeatedly executed at predetermined time intervals by the control unit 502 of the delivery management server 500. Initially, in S201, it is determined whether a request to deliver a package to the luggage compartment 15 has been made from the client user terminal 50. When affirmative determination is made in S201, the process proceeds to S202. When negative determination is made in S201, the authentication information request control is ended. When a request to deliver a package to the luggage compartment 15 has been made, the control unit 502 of the delivery management server 500 identifies the client user terminal 50, and the client user ID and package ID corresponding to the package to be delivered, based on information included in the delivery request.

In S202, it is determined whether fee payment specification is included in a signal from the client user terminal 50. When affirmative determination is made in S202, the process proceeds to S203. When negative determination is made in S202, the process proceeds to S205. In S203, payment information is acquired. The control unit 502 transmits, to the payment management server 600, a signal making a request to transmit payment information. As payment information has been transmitted back from the payment management server 600, the payment status shown in FIG. 3 is updated where necessary. In S204, it is determined whether a payment has been completed. That is, it is determined whether the payment status shown in FIG. 3 is "Completed". When affirmative determination is made in S204, the process proceeds to S205. When negative determination is made in S204, the authentication information request control is ended. That is, when negative determination is made in S204, no request to issue authentication information is transmitted to the center server 400. In S205, a signal making a request to issue authentication information corresponding to the vehicle 10 is transmitted to the center server 400. Thus, the authentication information request control ends. After that, as the delivery management server 500 receives authentication information issued from the center server 400, the delivery management server 500 transmits the vehicle information of the vehicle 10 to the delivery user terminal 200 together with the authentication information.

Figure 8:
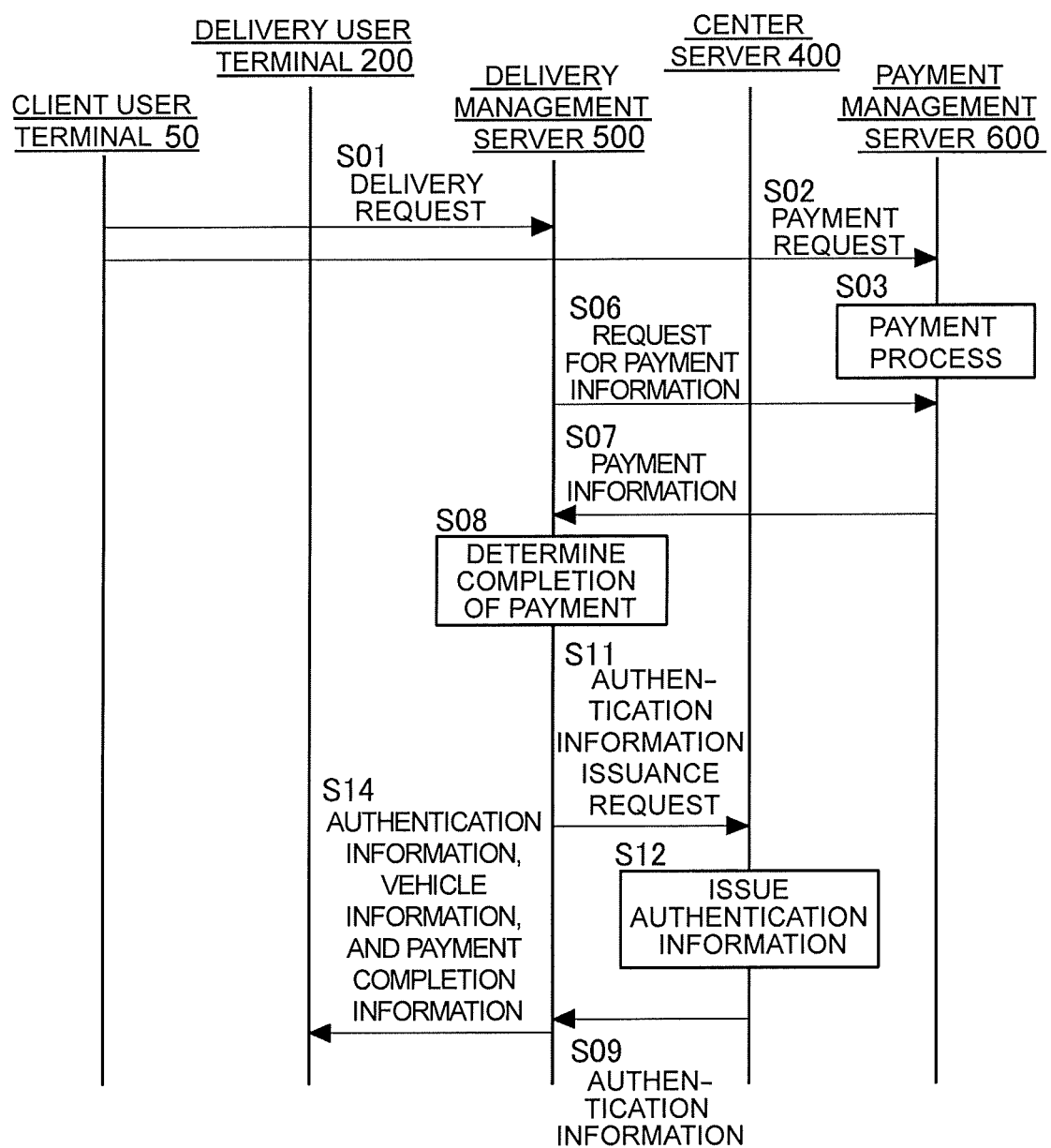
FIG. 8 is a view that shows the flow of operations of the delivery management system.

Next, the operations of the delivery management system 1 in the case where the delivery management server 500 determines whether a payment has been completed will be described with reference to FIG. 8. In FIG. 8, the processes of S01 to S03, S14 to S15, S21 to S24, and S31 to S38 are the same as those of the flow shown in FIG. 6 so the description thereof is omitted, and illustration thereof is partially omitted. In the flow shown in FIG. 8, as the delivery management server 500 receives a signal making a request to deliver a package from the client user terminal 50 (the process of S01), the delivery management server 500 transmits a signal making a request of the payment management server 600 for payment information (the process of S06). The payment management server 600 that has received this signal transmits the payment information to the delivery management server 500 (the process of S07). Transmission of a request of the payment management server 600 for payment information and reception of payment information from the payment management server 600 may be carried out via the center server 400. The delivery management server 500 updates the payment status shown in FIG. 3, and determines that a payment has been completed when the payment status is "Completed" (the process of S08). The payment management server 600 may transmit payment information to the delivery management server 500 as an electronic payment has been completed in S03, without a request from the delivery management server 500.

When the payment status is "Completed", the delivery management server 500 makes a request of the center server 400 to issue authentication information (S11). The center server 400 issues the requested authentication information of the vehicle 10 (the process of S12). The center server 400 transmits the authentication information to the delivery management server 500 (the process of S09). The processes from S14 after S09 are the same as those of the flow shown in FIG. 6.

As described above, according to the present embodiment, even when the vehicle 10 having the luggage compartment 15 has been specified as a place of delivery of a package for which the client user is specified as a payer of a fee, but when the client user pays the fee in advance through an electronic payment, it is possible to deliver the package to the luggage compartment 15 of the vehicle 10. Thus, it is possible to increase an opportunity to deliver a package.

What is claimed is:

1. A delivery management system comprising
a processor configured to:
   make, via a communication network, an electronic payment for a fee when a request to pay for the fee associated with a package has been made from a client user terminal, the client user terminal being used by a client user who submits a request to deliver the package to a predetermined compartment of a vehicle, and
   issue, via the communication network, conditional authentication information to a delivery user terminal when (i) the processor has made the electronic payment and (ii) the client user specifies that the client user will pay for the fee at the time of delivery of the package, the conditional authentication information specifying a condition for deletion of the conditional authentication information from the delivery user terminal,
wherein
the delivery user terminal is used by a delivery user who delivers the package,
the delivery user terminal is configured to transmit, via a short range wireless communication network, an unlock signal to a lock and unlock device to unlock the predetermined compartment with the conditional authentication information,
the delivery user terminal is configured to transmit, via the short range wireless communication network after the predetermined compartment is unlocked, a lock signal to the lock and unlock device to lock the predetermined compartment,
the delivery user terminal is configured to delete the conditional authentication information in response to a determination that the specified condition is met,
the lock and unlock device is provided in the vehicle, and
the lock and unlock device is configured to lock or unlock the predetermined compartment.

2. The delivery management system according to claim 1, wherein:
   the processor is configured to issue the conditional authentication information for locking or unlocking the predetermined compartment;
   wherein the processor is not permitted to issue the conditional authentication information when the processor has not completed the electronic payment for the fee in the case where the client user has specified that the client user will pay for the fee at the time of delivery of the package, and
   wherein the processor is permitted to issue the conditional authentication information when the processor has completed the electronic payment for the fee in the case where the client user has specified that the client user will pay for the fee at the time of delivery of the package.

3. The delivery management system according to claim 1, wherein a specification that the client user pays for the fee at the time of delivery of the package includes at least one of payment on delivery and freight collect.

4. The delivery management system of claim 1, wherein the condition specifies that the conditional authentication information is deleted from the delivery user terminal after the predetermined compartment is locked after being unlocked.

5. The delivery management system of claim 1, wherein the condition specifies that the conditional authentication information is deleted from the delivery user terminal after a predetermined amount of time has elapsed from reception of the conditional authentication information by the delivery user terminal.

6. A server comprising:
a processor configured to:
issue, via a communication network, conditional authentication information for locking or unlocking a predetermined compartment of a vehicle that is a place of delivery of a package, the conditional authentication information specifying a condition for deletion of the conditional authentication information;
wherein the server is not permitted to issue the conditional authentication information when (i) an electronic payment for a fee associated with the package has not been completed and (ii) a client user who has submitted a request to deliver the package to the predetermined compartment has specified that the client user will pay for the fee at the time of delivery of the package,
wherein the server is permitted to issue the conditional authentication information when (i) the electronic payment for the fee has been completed and (ii) the client user has specified that the client user will pay for the fee at the time of delivery of the package,
wherein an unlock signal including the conditional authentication information is transmitted via a short range wireless communication network to a lock and unlock device to unlock the predetermined compartment,
wherein a lock signal is transmitted via the short range wireless communication network to the lock and unlock device to lock the predetermined compartment after the predetermined compartment is unlocked, and
wherein the conditional authentication information is deleted in response to a determination that the specified condition is met.

7. A delivery management method that is executed by a server, the delivery management method comprising:
not permitting, by the server, issuance of conditional authentication information for locking or unlocking a predetermined compartment when (i) an electronic payment for a fee associated with a package has not been completed in a case where a vehicle having the predetermined compartment is specified as a place of delivery of the package and (ii) a client user who has submitted a request to deliver the package has specified that the client user will pay for the fee at the time of delivery of the package, the conditional authentication information specifying a condition for deletion of the conditional authentication information;
permitting, by the server, issuance of the conditional authentication information for locking or unlocking the predetermined compartment when (i) the electronic payment for the fee has been completed in the case where the vehicle is specified as a place of delivery of the package and (ii) the client user has specified that the client user will pay for the fee at the time of delivery of the package; and
issuing, by the server via a communication network, the conditional authentication information when issuance of the conditional authentication information is permitted,
wherein an unlock signal including the authentication information is transmitted via a short range wireless communication network to a lock and unlock device to unlock the predetermined compartment,
wherein a lock signal is transmitted via the short range wireless communication network to the lock and unlock device to lock the predetermined compartment after the predetermined compartment is unlocked, and
wherein the conditional authentication information is deleted in response to a determination that the specified condition is met.

8. A delivery management system comprising:
a client user terminal that is used by a client user who submits, via a communication network, a request to deliver a package to a predetermined compartment of a vehicle;
a lock and unlock device provided in the vehicle, the lock and unlock device being configured to lock or unlock the predetermined compartment;
a delivery user terminal that is used by a delivery user who delivers the package, the delivery user terminal being configured to transmit, via a short range wireless communication network, an unlock signal to the lock and unlock device to unlock the predetermined compartment with the use of conditional authentication information;
the delivery user terminal is configured to transmit, via the short range wireless communication network, a lock signal to the lock and unlock device to lock the predetermined compartment after the predetermined compartment is unlocked; and
a processor configured to make an electronic payment for a fee when a request to pay for the fee associated with the package has been made from the client user terminal, and
the processor being configured to issue, via the communication network, the conditional authentication information to the delivery user terminal when the processor has made the electronic payment in a case where there is specification that the client user pays for the fee at the time of delivery of the package,
wherein the conditional authentication information specifies a condition for deletion of the conditional authentication information from the delivery user terminal, and
wherein the conditional authentication information is deleted from the delivery user terminal in response to a determination that the specified condition is met.

* * * * *